J. A. DOBSON.
OIL WELL SCREEN.
APPLICATION FILED JUNE 4, 1919.

1,406,825.

Patented Feb. 14, 1922.

Inventor
J. A. Dobson

By (signature) Atty

UNITED STATES PATENT OFFICE.

JOHN A. DOBSON, OF GOOSE CREEK, TEXAS.

OIL-WELL SCREEN.

1,406,825.  Specification of Letters Patent.  Patented Feb. 14, 1922.

Application filed June 4, 1919. Serial No. 301,798.

*To all whom it may concern:*

Be it known that I, JOHN A. DOBSON, a citizen of the United States, residing at Goose Creek, in the county of Harris and State of Texas, have invented certain new and useful Improvements in Oil-Well Screens; and I do hereby declare the following to be full, clear, and exact description of the invention, such as will enable others skilled in the art to which it appertains to make and use the same.

This invention relates to new and useful improvements in screen or strainers especially adapted for use in oil or water wells and has for one of its objects the provision of means that effectively prevents the entrance of sand to the pump but will permit the oil or water to readily pass through the strainer or screen thus preventing the sand from cutting out the strainer or screen and other parts of the pump which is frequent in devices now on the market.

Another object of this invention is the provision of inner and outer screens having positioned therebetween asbestos adapted to act as a filtering agent and which is prevented from being broken by the pressure of the oil or water by the location of the screen with respect to said asbestos.

A further object of this invention is the provision of an oil well screen or strainer of the above stated character, which shall be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings in which.

Figures 1, 2:
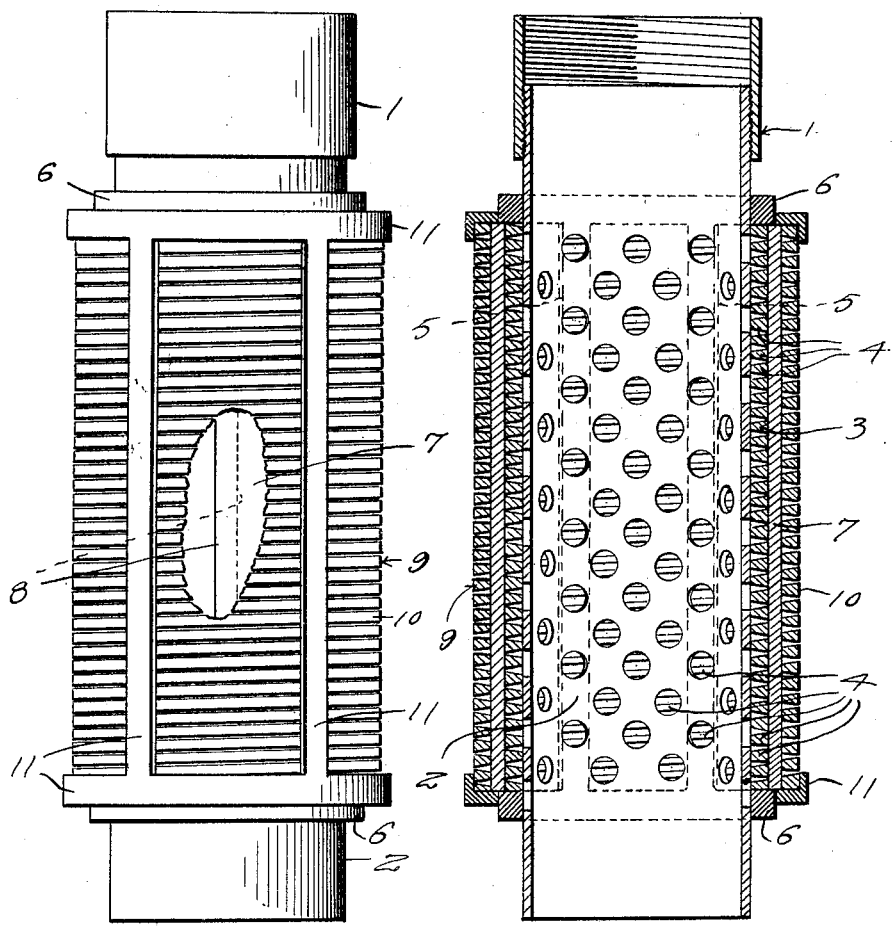
Figure 1 is a front elevation of an oil well strainer or screen constructed in accordance with my invention.
Figure 2 is a sectional view of the same illustrating the asbestos acting as a filtering agent.

Referring in detail to the drawings, the numeral 1 indicates as an entirety the screen or strainer for pumps used in oil or water wells and consists of a perforated member 2 which perforations are adapted to permit the water or oil to enter the member 2.

A screen or strainer 3 surrounds the perforated member 2 and is constructed from a single length of material preferably metal and the material is coiled about the member 2 and has the convolutions thereof slightly spaced as illustrated at 4 so that the oil or water may pass through the convolutions and through the perforations 2 into the member 1. The convolutions of the material are held in spaced relation and also in circular formation by strips of solder 5. Solder 6 is also placed around the upper and lower edges of the strainer 3 so as to reinforce and strengthen the same. A strip of asbestos 7 is placed about the strainer 3 in close relation thereto and has its edges 8 overlapped. A strainer 9 is positioned about the asbestos 7 and is constructed from a single length of material 10 which is wound about the asbestos having its convolutions relatively spaced to permit the oil or water to pass therethrough and also permit the same to pass through the sheet of asbestos. The material of the outer strainer is secured in position by strips of solder 11. The inner and outer strainers bear against the sheet of asbestos so as to hold the same in its proper position and also prevent it from breaking under pressure of the oil or water within the well.

From the foregoing description taken in connection with the accompanying drawings, it will be noted that a strainer or screen has been provided which will readily permit the entrance of water or oil but will exclude sand from the same, and also that the asbestos will prevent the sand from coming in contact with the perforated member or the inner screen, thus reducing the liability of the same becoming cut by the sand or wearing out.

While I have shown and described the preferred embodiment of my invention, it will be understood that minor changes in construction, combination, and arrangement of parts may be made without departing from the spirit and scope of the invention as claimed.

Having thus described my invention, what I claim is:—

1. A screen of the class described comprising a perforated member, an inner screen surrounding said member, a sheet of straining material surrounding said screen, an outer screen enclosing the sheet and inner screen to prevent relative movement thereof and maintain the meeting edges of the sheet in closed relation.

2. A screen of the class described comprising a perforated member, an inner screen surrounding said member, a sheet of straining material surrounding said screen, an outer screen enclosing the sheet and inner screen to prevent relative movement thereof and maintain the meeting edges of the sheet in closed relation, and each of said screens being a strip of material coiled into tubular form with the convolutions spaced but in relatively close relation to provide passageways therethrough for the liquid.

In testimony whereof I affix my signature in presence of two witnesses.

JOHN A. DOBSON.

Witnesses:
  A. English,
  E. B. Lambert.